`US009198184B2`

(12) United States Patent
Yeh et al.

(10) Patent No.: US 9,198,184 B2
(45) Date of Patent: Nov. 24, 2015

(54) DYNAMIC INTERFERENCE AVOIDANCE IN INTEGRATED MULTI-RADIO ACCESS TECHNOLOGIES (RAT) HETEROGENEOUS NETWORKS

(71) Applicants: Shu-Ping Yeh, Mountain View, CA (US); Nageen Himayat, Fremont, CA (US); Ali Yazdan Panah, San Jose, CA (US); Shilpa Talwar, Los Altos, CA (US)

(72) Inventors: Shu-Ping Yeh, Mountain View, CA (US); Nageen Himayat, Fremont, CA (US); Ali Yazdan Panah, San Jose, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 13/753,795

(22) Filed: Jan. 30, 2013

(65) Prior Publication Data
US 2014/0213310 A1 Jul. 31, 2014

(51) Int. Cl.
*H04B 15/00* (2006.01)
*H04W 72/08* (2009.01)
*H04W 88/06* (2009.01)
*H04W 48/18* (2009.01)

(52) U.S. Cl.
CPC .............. *H04W 72/08* (2013.01); *H04W 48/18* (2013.01); *H04W 88/06* (2013.01)

(58) Field of Classification Search
None
See application file for complete search history.

(56) References Cited

U.S. PATENT DOCUMENTS

| 2006/0056448 | A1 | 3/2006 | Zaki et al. | |
|---|---|---|---|---|
| 2009/0257390 | A1 | 10/2009 | Ji et al. | |
| 2011/0244874 | A1* | 10/2011 | Fodor et al. | 455/450 |
| 2011/0300807 | A1 | 12/2011 | Kwun et al. | |
| 2013/0003591 | A1* | 1/2013 | Novak et al. | 370/252 |

FOREIGN PATENT DOCUMENTS

| WO | WO-2010067999 A2 | 6/2010 |
|---|---|---|
| WO | WO-2012148203 A2 | 11/2012 |
| WO | WO-2014120863 A1 | 8/2014 |

OTHER PUBLICATIONS

"International Application Serial No. PCT/US2014/013739, International Search Report mailed Apr. 29, 2014", 4 pgs.
"International Application Serial No. PCT/US2014/013739, Written Opinion mailed Apr. 29, 2014", 6 pgs.

* cited by examiner

*Primary Examiner* — Edward Urban
*Assistant Examiner* — Mohammed Rachedine
(74) *Attorney, Agent, or Firm* — Schwegman Lundberg & Woessner, P.A.

(57) ABSTRACT

A system provides dynamic interference avoidance in integrated multi-radio access technology (RAT) heterogeneous networks (Het-Nets). A multi-mode user equipment accesses mobile communications services using RATs. An integrated node provides a primary cell and at least one secondary cell to the multi-mode user equipment. Initial radio access technologies (RATs) are assigned to the multi-mode user equipment from among a plurality of RATs for use by the multi-mode user equipment. Quality metrics are collected across the plurality of RATs. RAT assignments are re-evaluated based on the collected quality metrics. To provide dynamic interference mitigation in multi-RAT Het-Nets, RAT assignments are periodically repartitioned from among the plurality of RATs for use by the multi-mode user equipment based on the re-evaluation of RAT assignments using the collected quality metrics.

16 Claims, 6 Drawing Sheets

DYNAMIC INTERFERENCE AVOIDANCE IN INTEGRATED MULTI-RADIO ACCESS TECHNOLOGIES (RAT) HETEROGENEOUS NETWORKS

BACKGROUND

The growing adoption of rich multimedia services has resulted in explosive demand for wireless data capacity. Recent studies indicate that wireless traffic has grown at a rate that is approximately an order of magnitude higher than spectral efficiency enhancements available to meet the required increase in capacity. This gap will increase further as the number of devices per person increases, and newer devices enable the consumption of even richer multimedia content.

Recent work in the area of heterogeneous networks (Het-Nets) has primarily focused on network overlay techniques for offloading data traffic to smaller cells. Heterogeneous networks overlay low power and low cost devices on coverage holes or capacity-demanding hotspots to supplement existing single-tier cellular networks. While large cells, covered by macro base stations (MBSs), for example, provide blanket coverage and seamless mobility, small cells served by devices like femto access points (FAPs), pico base stations (PBSs), WiFi access points (APs) and relay-stations (RSs) help provide coverage extension and boost local capacity. To boost capacity further, the network may leverage spectrum across different radio access technologies (RATs).

One of the key elements of long term evolution (LTE) is the need to coexist with other RATs. Deployments typically aim for full spectral reuse across the tiers and the cells in the network as licensed spectrum is expensive and scarce. The integrated small-cells used in multi-RAT heterogeneous network architectures may also co-locate WiFi®/LTE radio interfaces. Such integrated infrastructure lowers cost by leveraging common infrastructure across multiple RATs, such as common site acquisition, backhaul etc.

Interference is a concern for wireless communication due to the need to maximally reuse scarce spectral resources. In multi-tier networks, the interference problem is even more severe because there is additional cross-tier interference when the overlaid small cells reuse the same spectrum as macrocells. Typically, the interference can be mitigated via periodically muting the transmission of macro-cells (or small cells) to protect the transmission of small cells (macro-cells) at the cost of reducing overall spectral efficiency.

Given that an increasing number of clients in the network are equipped with multiple radio interfaces, e.g., WiFi® in addition to 4G, an operator can also exploit the different radio networks to add low-cost capacity, and improve coverage and quality of service (QoS) in the network. In addition to the multitier aspect of Het-Nets, multi-RAT network components contribute extra performance enhancement. In Multi-RAT Het-Nets, the availability of additional RATs (e.g. WiFi®) provides extra flexibility to partition the radio resources among users to mitigate the effect of interference.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
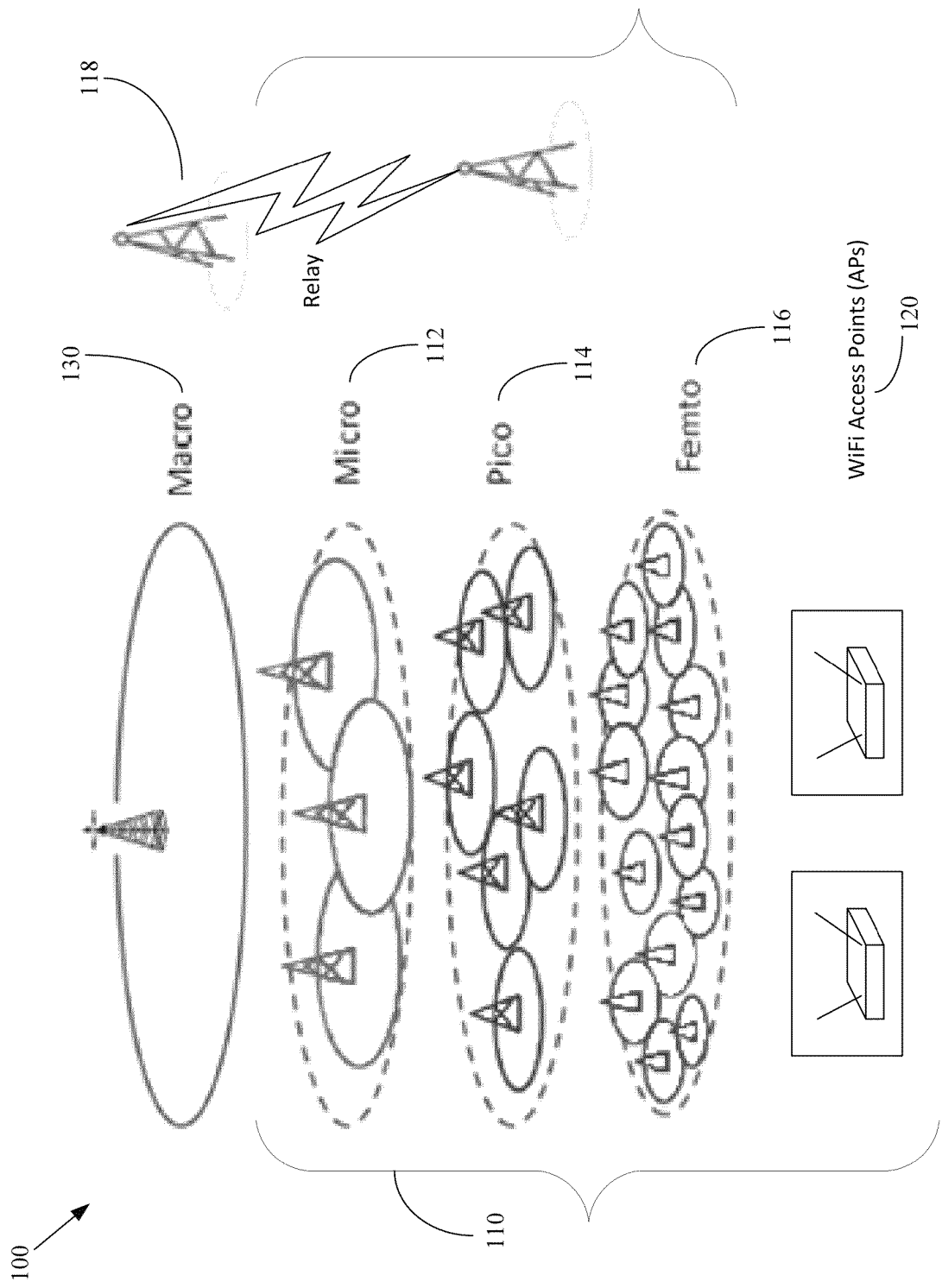
FIG. 1 illustrates a multi-tier, multi-RAT heterogeneous network (Het-Net) architecture according to an embodiment.

FIG. 1 illustrates a multi-tier, multi-RAT heterogeneous network (Bet-Net) architecture 100 according to an embodiment. The multi-tier, multi-RAT heterogeneous network architecture 100 includes a tier of small cells 110, e.g., micro 112, pico 114, femto 116, relay stations 118, WiFi Aps 120, etc., overlaid on the macro cellular network 130 to augment network capacity. The tier of small cells 110 provides a cost-effective addition of cellular capacity and coverage. In the multi-tier, multi-RAT heterogeneous network architecture 100, the bulk of the traffic of the macro network 130 may be offloaded to small cells 110, whereas a wide area coverage and mobility is maintained through the macro network 130. Deployments typically aim for full spectral reuse across the tiers of small cells 110 and the cells in the macro network 130 as licensed spectrum is expensive and scarce. Deployments also seek to access additional spectrum available across multiple radio access technologies (for example the un-licensed spectrum available for WiFi technology).

Figure 2:
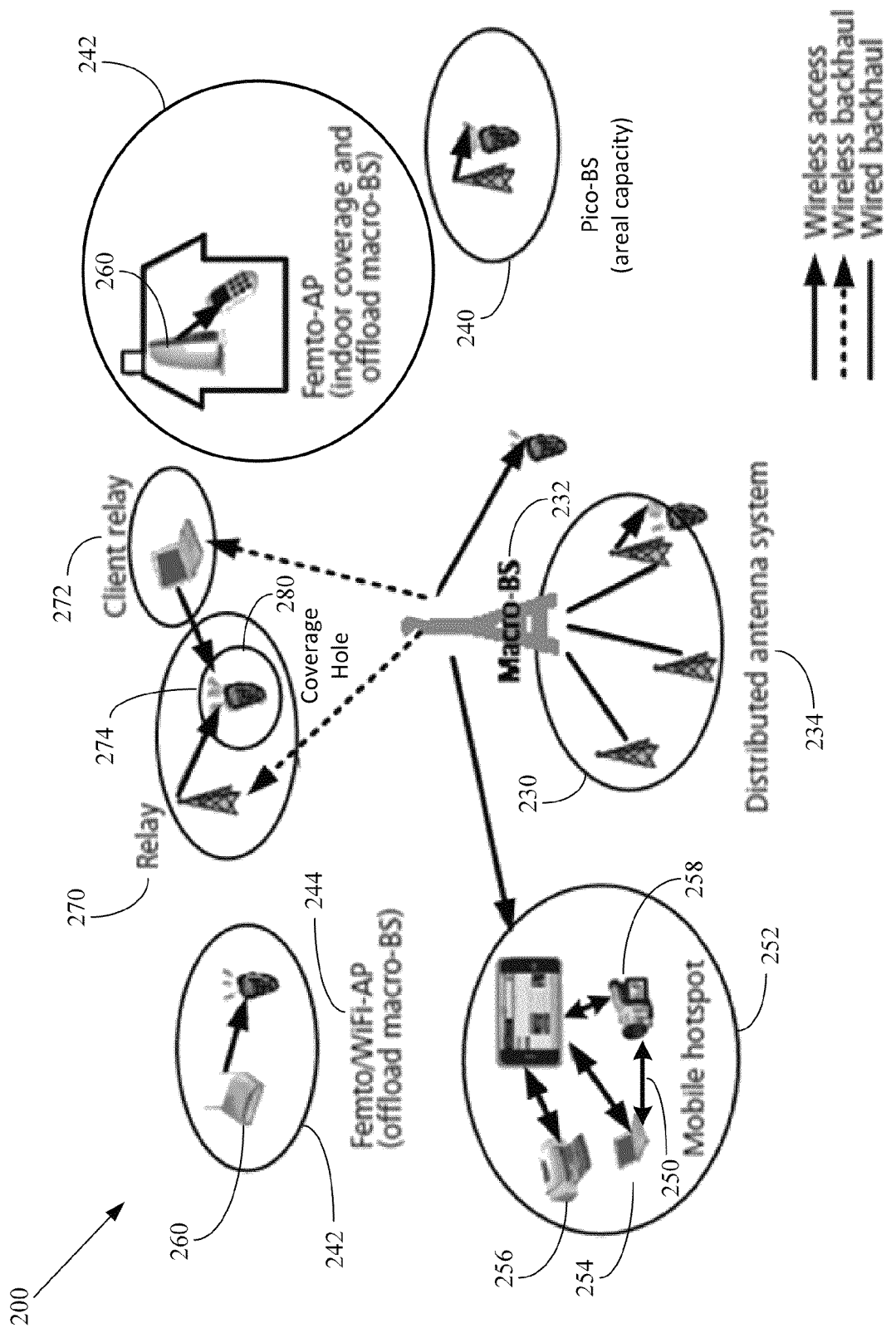
FIG. 2 illustrates a Het-Net according to an embodiment.

FIG. 2 illustrates a Het-Net 200 according to an embodiment. In FIG. 2, the Het-Net 200 includes traditional large macrocells 230 and smaller cells including pico cells 240 and femto cells 242. In addition, WiFi 244 can also be used as an acceptable mechanism for traffic offload. Each cell may share a common spectrum. Client-to-client communication 250 can be viewed as an additional tier.

Mobile hotspots 252 provide wireless Internet access for many devices, e.g., laptop 254, printers 256, media devices 258, etc. Mobile hotspots 252 may be provided using a mobile device subscribed to a mobile broadband service from a cellular provider. Femto cells 242 are similar to WiFi "hotspots" but are part of a cellular network, rather than a wireless local area network (WLAN). The femto base stations 260 work in many ways like a larger "macro" base station 232, but on a much smaller scale with low output power designed for small spaces such as apartments, houses, offices, etc. A relay station 270 is a station that receives a transmission of data and/or other information from an upstream station (e.g., an eNB or a UE) and sends a transmission of the data and/or other information to a downstream station (e.g., a UE or an eNB). A relay station 270 may also be a UE 272 that relays transmissions for other UEs 274. Coverage holes 280 may occur in-between femto cell and other cells, such as macrocell 230 having distributed antenna system 234, pico cell 240, femto cell 242, etc. Relays 270 may be used to address the coverage holes 280.

However, in multi-tier networks, interference is even more severe because there is additional cross-tier interference when the overlaid small cells, e.g., pico cells 240, femto cells 242 and relays 270, reuse the same spectrum as macrocells 230. For example, pico-users experiencing significant LTE interference from macro base stations 232 can be assigned to the WiFi carrier to avoid LTE interference. However, the WiFi bands are also subject to interference because anyone can access the un-licensed WiFi spectrum. Further, WiFi deployments are also affected by interference from hidden nodes due to mismatches in carrier-sensing and interference ranges. Therefore, unlike the cross-tier interference generated on the cellular spectrum, the interference on WiFi bands is more dynamic as well as much more difficult to manage.

Figure 3:
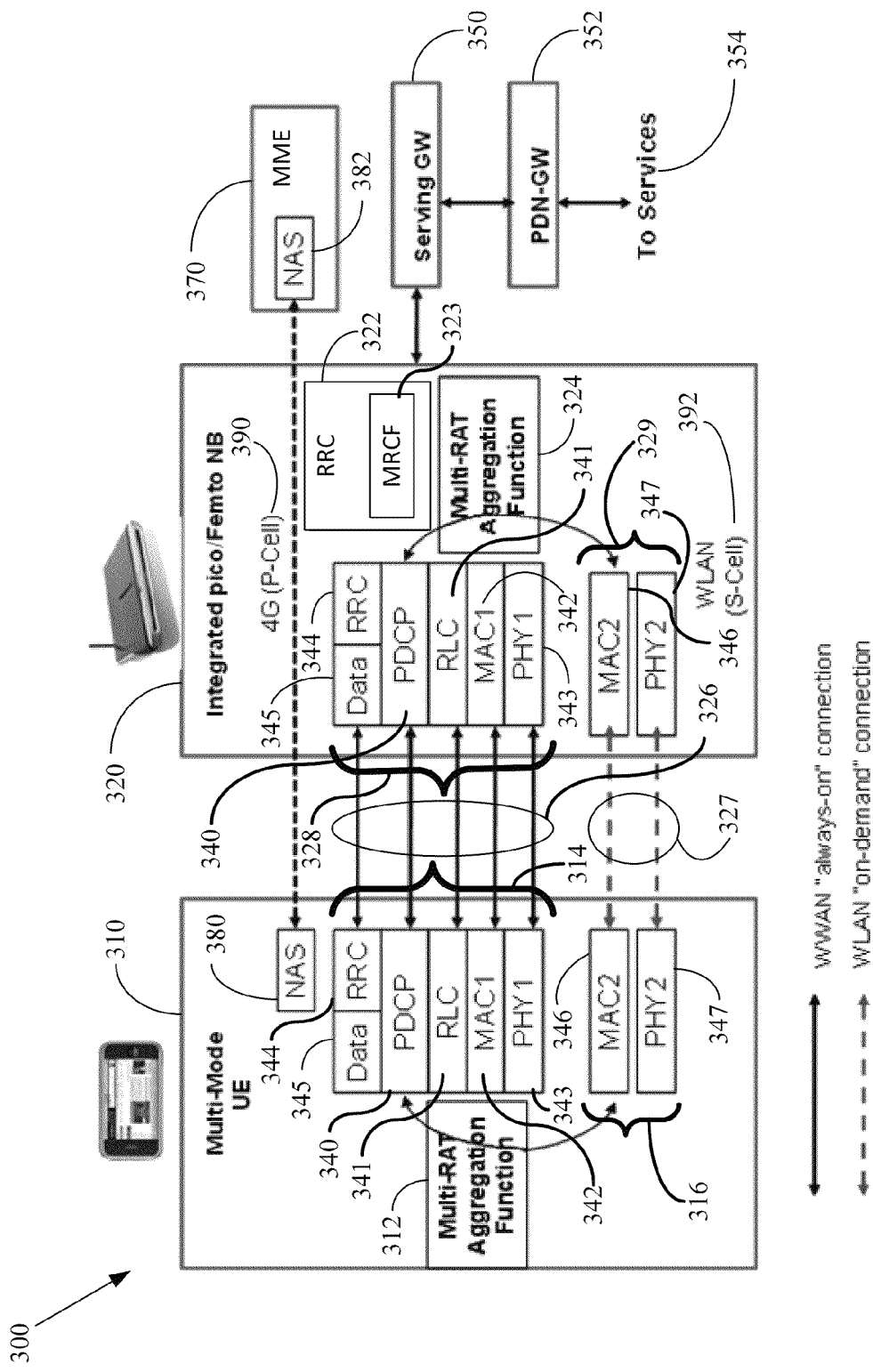
FIG. 3 illustrates an integrated WiFi-cellular small cell multi-RAT architecture according to an embodiment.

FIG. 3 illustrates an integrated WiFi-cellular small cell multi-RAT architecture 300 according to an embodiment. An integrated multi-RAT infrastructure 300 allows for tighter integration between multiple radio networks when used with multi-mode user equipment (UE). Capacity and quality of service (QoS) performance may be improved by tightly coupling multiple radio networks in multi-RAT Het-Net deployments. Managing WiFi as a "virtual carrier" provides opportunistic data transmission under the control of a radio resource controller (RRC) 322. The integrated multi-RAT architecture shown in FIG. 3 enables "virtual carrier" WiFi for multi-mode user equipment (UE).

In FIG. 3, multi-mode UE 310 accesses services through an integrated node 320. The integrated node 320 may be an evolved nodeB (eNodeB or eNB) and provides the multi-mode UE 310 access to services 354 through a serving gateway (GW) 350 and a packet data network (PDN) GW 352. The serving GW 350 routes and forwards user data packets, while also acting as the mobility anchor during inter-node handovers and as the anchor for mobility between technologies, such as LTE, 3GPP, WiMax®, etc. The PDN GW 352 provides connectivity to the multi-mode UE 310 to services 354 of external packet data networks by being the point of exit and entry of traffic for the multi-mode UE 310.

A Mobility Management Entity (MME) 370 acts as the key control-node. The MME is responsible for idle multi-mode UE 310 tracking and paging procedure including retransmissions. The MME 370 is involved in the bearer activation/deactivation process and is also responsible for choosing the serving GW 350 for a multi-mode UE 310 at the initial attach and at time of intra-LTE handover involving Core Network (CN) node relocation. The MME 370 is also responsible for authenticating the multi-mode UE 310. The Non-Access Stratum (NAS) 380, 382 at the multi-mode UE 310 and the integrated node 320, respectively, provide signaling between the multi-mode UE 310 and the MME 370. The NAS 380, 382 supports mobility of the multi-mode UE 310 and session management procedures to establish and maintain IP connectivity between the multi-mode UE 310 and the packet data network gateway (PDN GW) 352.

In the integrated node 320, a radio resource controller (RRC) 322 manages the radio resources and generates control signals to configure the transport, logical, and physical channels and handles signaling with the multi-mode UE 310. More specifically, transmission on a WiFi link is managed by the RRC 322 on the cellular (WWAN) side (4G P-Cell) 390, which provides the management and control functions. The WiFi link 327 of the WLAN S-Cell 392 may thus be used to opportunistically transmit data for a cellular session.

The integrated node 320 may be an integrated pico or femto node. However, the integrated node 320 is not meant to be limited to a pico or femto node. The integrated node also provides connections to the mobile phone network and communicates directly with the multi-mode UE 310. Multi-RAT aggregation functions 312, 324 are provided on the multi-mode UE 310 and the integrated node 320, respectively, to satisfy higher data rate needs using multiple carrier components that each multi-mode UE 310 may support, e.g., one primary carrier component (PCC) 326 and optionally one or more secondary carrier components (SCC) 327. The PCC 326 will be kept active. Related to the multiple carrier components is the concept of a primary cell (P-cell) 390 and a secondary cell (S-cell) 392. A primary cell 390 is established by the radio resource control connection procedure, and a secondary cell 392 is established by a secondary cell adding message. If more than one carrier component (CC) is configured for the multi-mode UE 310, the additional CCs are denoted as secondary cells (S-Cells) 392 for the user.

The integrated node 320 and the multi-mode UE 310 provide user plane and control plane protocol functions 328, 314, respectively. The user plane functions are supported by the packet data convergence protocol (PDCP) 340, the Radio Link Control (RLC) 341, media access control (MAC) 342, and the physical layer (PHY) 343. The control plane functions are supported by the radio resource controller (RRC) layer 344. A data link layer 345 provides the functional and procedural means to transfer data between network entities and may detect and correct errors that may occur in the physical layer.

The packet data convergence protocol (PDCP) 340 performs IP header compression and decompression, transfers user data, and maintains sequence numbers for Radio Bearers, which are configured for lossless serving radio network subsystem (SRNS) relocation. The RLC layer 341 is used to format and transport traffic between the multi-mode UE 310 and the integrated node 320. The media access control (MAC) layer 342 provides the function of the scheduler which distributes the available bandwidth to a number of active UEs and provides random access procedure control. The RLC 341 also performs segmentation and/or concatenation of PDCP PDUs to fit the size required by the MAC layer 342 and on the receive path, the RLC 341 reconstructs the PDCP PDUs. The physical layer (PHY) 343 conveys both data and control information between base stations, e.g., the integrated node 320, and the multi-mode UE 310. The PHY layer 343 also allows data to be directed to or from multiple users on a subcarrier-by-subcarrier basis for a specified number of symbol periods.

The integrated node 320 provides 4G service via a primary cell 390 and WLAN service via a secondary cell 392. The 4G primary cell 390 provides an always-on connection. The control plane signaling in FIG. 3 shows the layers that are involved in activating carrier aggregation for the multi-mode UE 310. The WLAN secondary cell 392 provided by the integrated node 320 also shows a second control plane for the WLAN on-demand connection. The multi-RAT aggregation functions 312, 324 in the multi-mode UE 310 and the integrated node 320 support the aggregation of the 4G primary cell 390 and the WLAN secondary cell 392. The second control planes 316, 329 in the multi-mode UE 310 and the integrated node 320, respectively, include a second MAC layer 346 and a second physical layer 347. Packets are provided by the PDCP 340 handling messages from the RRC 344. While an embodiment reflective of primary and secondary cell is used for clarifying purposes, embodiments may also function without the use of such "carrier aggregation" framework. The switching algorithms are compatible with other embodiments of 3GPP architectures; e.g., they may work equally work with other non-3GPP architectures and further may involve aggregation/switching across multiple additional radio access technologies—not necessarily 3GPP-LTE and WiFi.

Dynamic interference on WiFi bands may be avoided by utilizing LTE bands as a fall-back mechanism. In particular, dynamic interference extends the network-based RAT assignment framework to dynamically adapt RAT assignments in response to uncoordinated WiFi interference. Specifically, RAT re-partitioning is periodically performed. Each time before an LTE frame is scheduled, the Multi-RAT coordination function (MRCF) 323 provided by the RRC 322 within the integrated node 320 periodically checks to determine whether to perform user RAT re-partitioning. Multi-RAT user partitioning and offloading methods, described herein below, are used to optimize the overall utility across the multi-mode UEs 310 in a multi-RAT heterogeneous network 300. A regular update framework alternately schedules measurements to collect the utility metrics across RATs and then re-evaluates the best RAT assignment across multi-mode UE 310. The scheme adjusts the measurement period to trade off the need for up-to-date measurements with the overhead of collecting measurements. Accordingly, dynamic interference in multi-RAT Het-Net 300 may be mitigated using a periodic RAT assignment framework.

Figure 4:
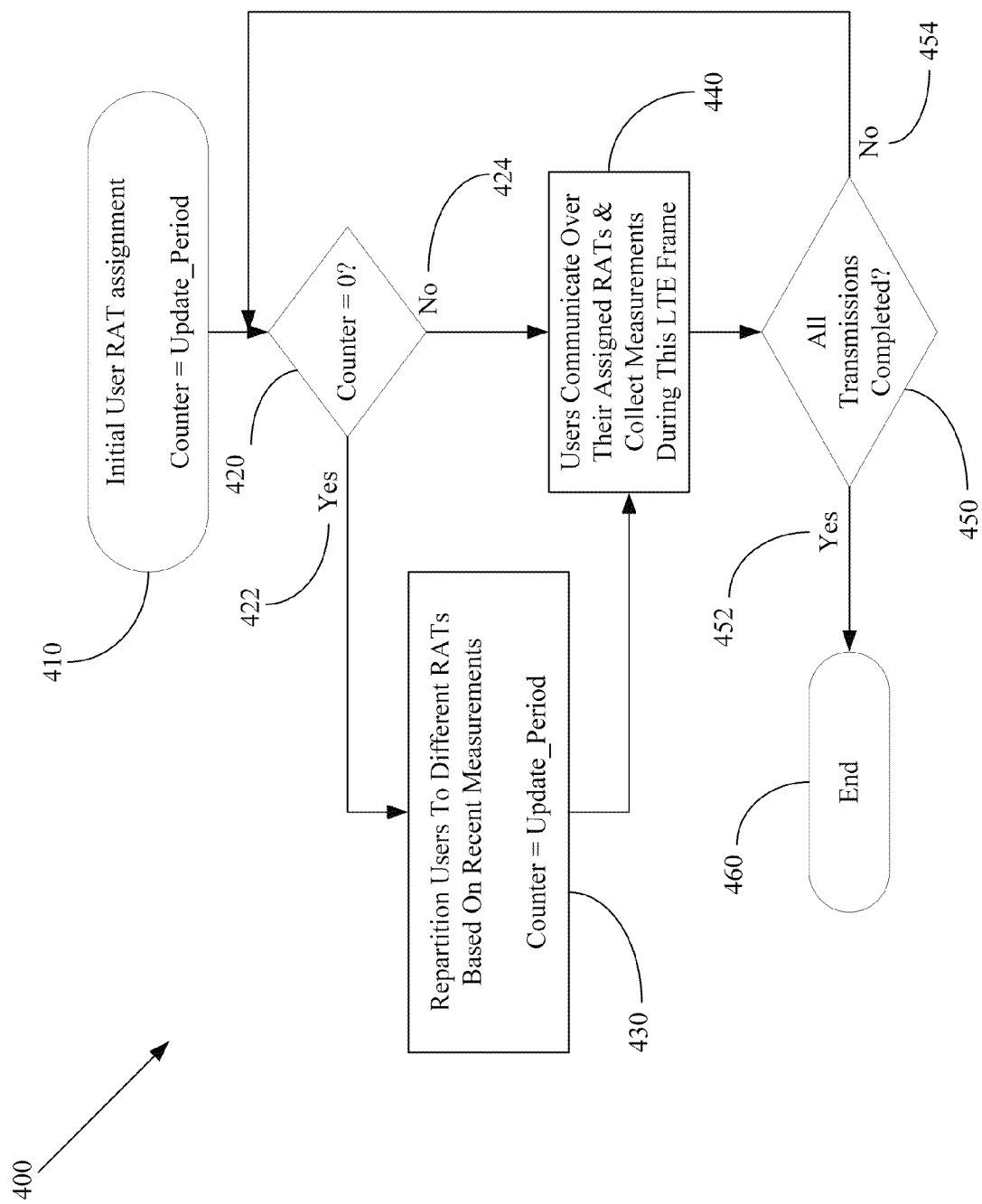
FIG. 4 is a flowchart of a method for providing dynamic interference avoidance in integrated multi-RAT heterogeneous networks according to an embodiment.

FIG. 4 is a flowchart 400 of a method for providing dynamic interference avoidance in integrated multi-RAT heterogeneous networks according to an embodiment. In FIG. 4, an initial user RAT assignment across users is made and the counter is set to equal the update period 410. The initial user RAT assignment can be accomplished via a simple random assignment of users to one of the RATs or by using more sophisticated RAT assignment algorithms. For example, UEs can temporarily use radios over "test warm-up frames" to collect measurements and perform one of the RAT assignment optimization algorithms.

A determination is made whether the counter is equal to zero 420. If yes 422, the users are repartitioned to different RATs based on recent measurements and the counter is set to equal the update period 430. Accordingly, the users are repartitioned across RATs periodically based on the "Update_Period." The update period may be set to be a multiple of the LTE frame duration and the re-partitioning operation takes place before the LTE resources are scheduled. Each time before an LTE frame is scheduled, the Multi-RAT coordination function (MRCF) within the integrated node checks the "Counter" to determine whether to perform user RAT re-partitioning. If the updating period is reached, the MRCF will execute the user RAT partitioning algorithm based on recent measurements. In order to capture the current interference behavior, recent measurements on the desired metrics are used for user RAT re-partitioning.

Special processing is required to ensure smooth transitions across RAT re-assignments when users have incomplete HARQ transmissions on the LTE link or ongoing transmissions on the WiFi link. If the UEs are capable of simultaneous operation on both LTE and WiFi bands, dual-radio operation may be activated for users with incomplete transmission on the current RAT while transitioning to the newly assigned RAT. This temporary dual-radio operation ends once the incomplete transmission is finished.

An alternative approach is to prohibit the users with incomplete transmission on one RAT to be included in current user RAT re-partitioning operation. Thus, those users will remain on their RATs to complete the transmission, until the next re-assignment opportunity. Another option is to discard the incomplete transmission if the user is assigned to another RAT.

If not 424, or after repartition 430, user communicate over their assigned RATs and collect measurements during this LTE frame 440. Accurate and up-to-date measurements across users on both WiFi and LTE links are required for RAT re-partitioning decisions. There-partitioning decisions can be based on several metrics, such as, channel quality, link throughput, loading/congestion level of each radio, QoS needs, etc. Users and eNBs can coordinate to collect the required measurements for these metrics. For example, one measurement is based on using per link rate and throughput as a metric for the RAT assignment decisions. It is easy to estimate metrics such as per link throughput for the radio link that is being actively used for transmitting data. However, it is difficult to project metrics across links that are not being used. The LTE air interface allows for periodic CQI feedback, which may be used to project metrics such as throughput, without the need for active data transmission. However, it is very difficult to predict congestion or throughput on the WiFi link without active data transmission on the WiFi radio. For example, to estimate WiFi congestion level, packets are sent over the WiFi link to measure the packet completion time. Hence, if a user assigned to the LTE link, special effort is required to get the WiFi link metrics for this user.

To address this issue, the "last" WiFi measurement of the user can be re-used for user RAT re-partition. The major problem of this approach is that without very frequent measurements, such measurements may be outdated therefore interference cannot be avoided effectively. Other variations such as the median of the last N+1 WiFi measurements are possible.

Alternatively, users may be periodically assigned to the WiFi link. This can ensure that the "last" WiFi measurement is not very out-of-date. However, in a very dynamic environment, it may be difficult to effectively avoid the interference, without frequent assignments, which incur significant overhead. Still further, periodic WiFi test packets may be schedules for both LTE and WiFi users. The WiFi measurements are maintained in an up-to-date condition at the cost of scheduling a few test packets for weak WiFi users.

For the users assigned to WiFi radio, accurate measurements of LTE metrics are obtained. For example, even when a user is assigned to the WiFi radio, the user still listens to LTE preamble and pilot signals to estimate the channel quality. Overall, the system is designed such that each UE has reliable measurements on both RATs and the user RAT re-partitioning is effectively at avoiding dynamic interference on both radios.

A determination is made whether the transmission have been completed 450. If yes 452, the process ends 460. If not 454, the process returns to the determination of whether the counter is equal to zero 420.

Figure 5:
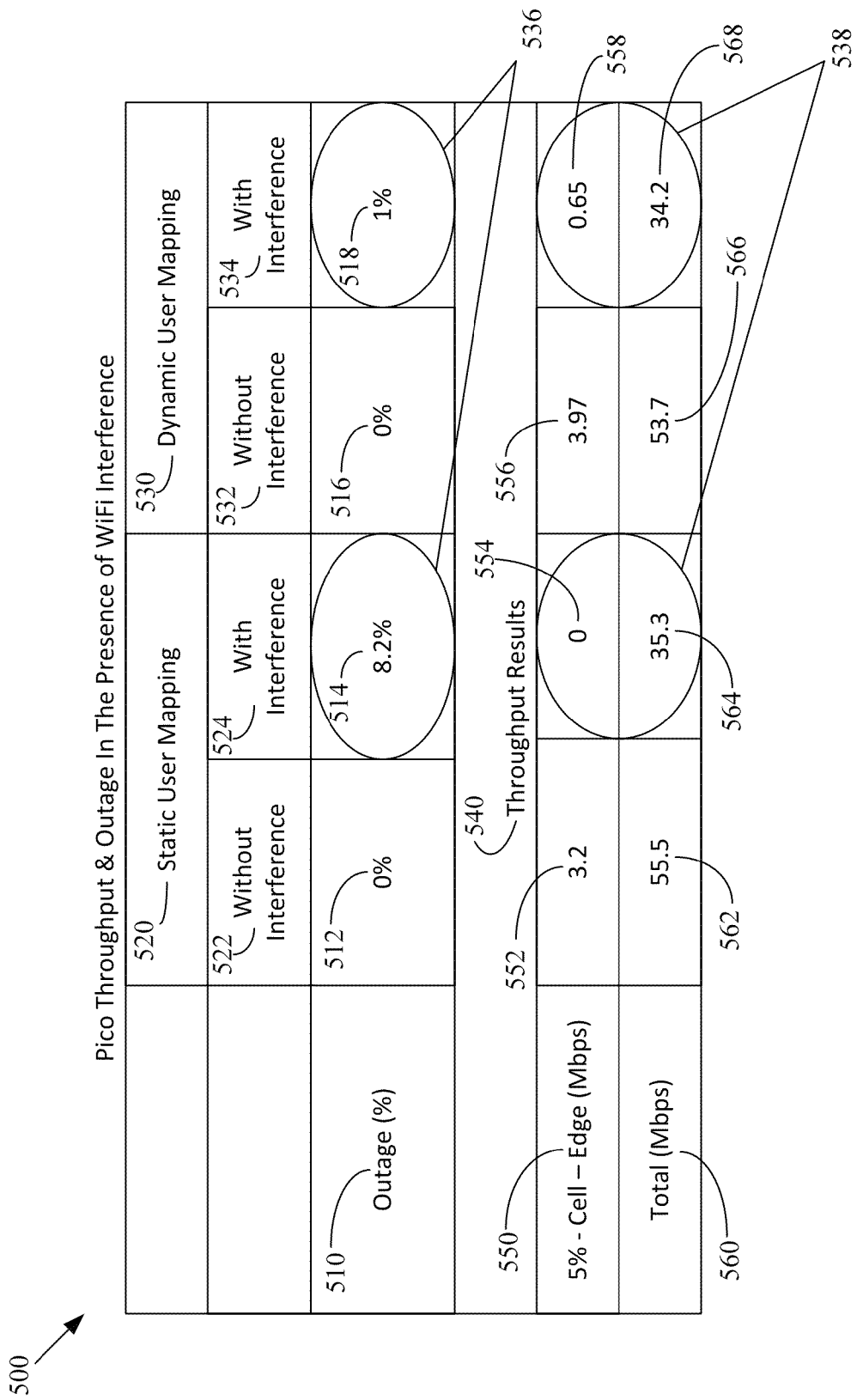
FIG. 5 is a table showing pico throughput and outage in the presence of WiFi interference with dynamic user mapping according to an embodiment.

FIG. 5 is a table 500 showing pico throughput and outage 510 in the presence of WiFi interference with dynamic user mapping 530 according to an embodiment. In FIG. 5, outage 510 is shown using static user mapping 520 without interference 522 and with interference 524. Outage 510 is also shown using dynamic user mapping 530 without interference 532 and with interference 534. Throughput results 540 are shown using static user mapping 520 without interference 522 and with interference 524. Throughput results 540 are further shown using dynamic user mapping 530 without interference 532 and with interference 534. Measurements of throughput are shown at 5% cell-edge 550 and a total throughput 560.

Without interference 522 and using static user mapping 520, outage 510 is 0% 512. Using static user mapping 520 with interference 524, the outage 510 is 8.2% 514. Without interference 532 and using dynamic user mapping 530, outage 510 is 0% 516. Using dynamic user mapping 530 with interference 534, the outage 510 is 1% 518. The dynamic user mapping 530 thus restores system outage 510 when the WiFi link quality drops due to interference 534 as can be seen at comparison 536.

When no interference is present 522, cell-edge throughput 550 is 3.2 Mbps 552 using static user mapping 520. When interference is present 524 and static user mapping 520 is used, cell-edge throughput 550 is 0 Mbps 554. When no interference is present 532, cell-edge throughput 550 is 3.97 Mbps 556 using dynamic user mapping 530. When interference is present 534 and dynamic user mapping 530 is used, cell-edge throughput 550 is 0.64 Mbps 558.

Total throughput 560 when static user mapping 520 and interference is not present 522 is 55.4 Mbps 562. Total throughput 560 when static user mapping 520 and interference is present 524 is 35.3 Mbps 564. Total throughput 560 when dynamic user mapping 530 and interference is not present 532 is 53.7 Mbps 566. Total throughput 560 when dynamic user mapping 530 and interference is present 534 is 34.2 Mbps 568. Accordingly, WiFi interference degrades system and cell-edge throughput, but minimum cell-edge throughput is preserved with dynamic user mapping 530 as can be seen at comparison 538. Thus, interference avoidance schemes that can adapt to uncoordinated and dynamic interference on the WiFi spectrum provide gains from WiFi-based to Het-Net architectures.

Accordingly, dynamic interference avoidance is provided in Multi-RAT Bet-Nets. Through periodic repartitioning of users across RATs, users may be assigned across WiFi and LTE interfaces to avoid dynamically changing interference. Significant performance gains are achieved, e.g., greater than a five times reduction in system outage 510.

Figure 6:
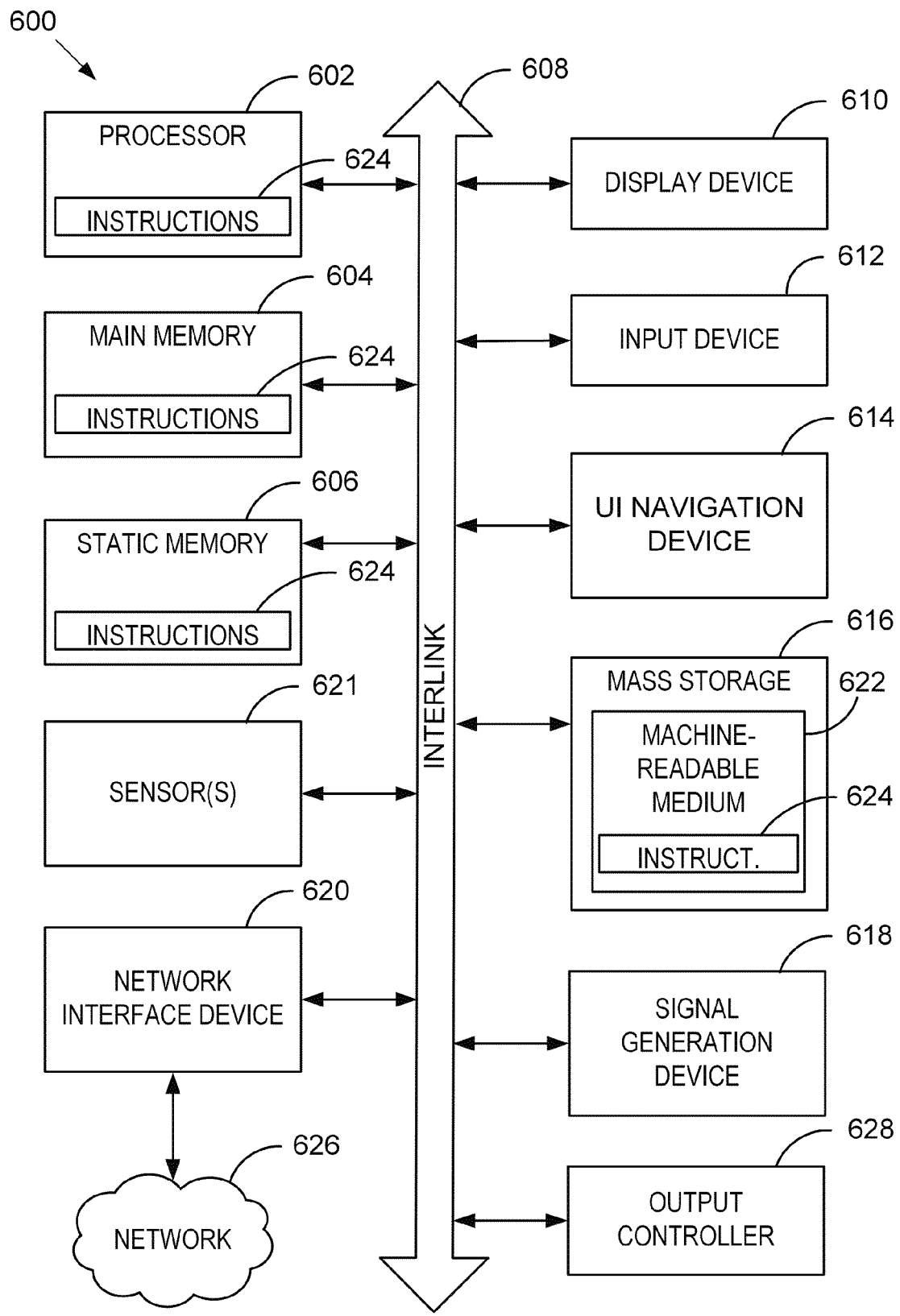
FIG. 6 illustrates a block diagram of an example machine for providing dynamic interference avoidance in integrated multi-RAT heterogeneous networks according to an embodiment.

FIG. 6 illustrates a block diagram of an example machine 600 for providing dynamic interference avoidance in integrated multi-RAT heterogeneous networks according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 611 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, embodiments may include less than all features of those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. An integrated node, comprising:
    a plurality of protocol stacks arranged to handle communication at a layer in the protocol stack to provide a primary control air interface for a cellular mobile communications service and at least one secondary control air interface for a wireless local area network (WLAN) service; and
    a radio resource controller (RRC), coupled to the plurality of protocol stacks, the RRC arranged to:
        partition a plurality of multi-mode user equipments (UEs) to each be initially assigned to one of a plurality of radio access technologies (RATs), each RAT associated with one of the primary control air interface and the at least one secondary control air interface,
        obtain collected quality metrics across the plurality of RATs, including uncoordinated interference across alternate unmanaged RATs,
        re-evaluate RAT assignments based on the obtained collected quality metrics, and
        periodically re-partition RAT assignments from among the plurality of RATs for use by the multi-mode UEs based on the re-evaluation of RAT assignments to switch at least some of the initial assignments between the at least one secondary control air interface and the primary control air interface.

2. The integrated node of claim 1, wherein the alternate unmanaged RATs comprise RATs associated with a WLAN service.

3. The integrated node of claim 1, wherein the primary control air interface and at least one secondary control air interface comprises a primary cell and a secondary cell, respectively.

4. The integrated node of claim 3, wherein the secondary cell comprises a range of 10-200 meters.

5. The integrated node of claim 3, wherein the secondary cell is selected from a group comprising a Femto cell, a Pico cell, a WiFi access point and a relay.

6. The integrated node of claim 1, wherein the RRC provides access to services through a serving gateway (S-GW) and a packet data network (PDN) GW (P-GW).

7. The integrated node of claim 1, wherein the RRC is to further manage the radio resources and generates control signals to configure transport, logical, and physical channels and handles signals for the multi-mode mode UEs.

8. An evolved nodeB (eNodeB), comprising:
a radio resource controller (RRC) arranged to manage radio resources and to generate control signals, the RRC further arranged to handle signals for a plurality of multi-mode user equipments (UEs) including signals for transmission via a WiFi link arranged to transmit data for a cellular session and a cellular link arranged to transmit data for the cellular session; and
a Multi-radio access technologies (RAT) aggregation function arranged to provide a high data transfer rate through multiple carrier components including a primary cell to provide a cellular service and a secondary cell to provide wireless local area network (WLAN) service;
wherein the RRC includes a multi-RAT coordination function (MRCF) arranged to:
partition the plurality of multi-mode UEs to each be initially assigned to a RAT associated with one of the cellular service or the WLAN service; and
periodically determine when to re-partition RAT assignments to dynamically change RAT assignments for one or more the multi-mode UEs to dynamically mitigate changing interference.

9. The eNodeB of claim 8, wherein the RRC is further arranged to communicate with a mobility management entity (MME) to receive control-node functions.

10. The eNodeB of claim 8, wherein the RRC arranged to provide access to services through a serving gateway (S-GW) and a packet data network (PDN) GW (P-GW).

11. The eNodeB of claim 8, wherein the RRC manages the radio resources and generates control signals to configure transport, logical, and physical channels and handles signals for the multi-mode UEs.

12. The eNodeB of claim 8, wherein the changing interference comprises uncoordinated WiFi interference.

13. A method, comprising:
performing initial radio access technology (RAT) assignments for partitioning a plurality of multi-mode user equipments (UEs);
setting an update period counter to equal an update period;
obtaining quality measurements associated with a plurality of RATs during the update period, each RAT associated with one of a primary control air interface for a cellular mobile communications service and at least one secondary control air interface for a wireless local area network (WLAN) service;
implementing communication by the multi-mode UEs with assigned RATs based on the obtained quality measurements;
collecting quality measurements associated with the plurality of RATs during a current frame until the update period has expired;
determining uncoordinated interference across alternate unmanaged RATs from the quality measurements collected during the current frame;
repartitioning at least some of the multi-mode UEs to different RATs from among the plurality of RATs in response to the determined uncoordinated interference; and
resetting the update period counter to equal the update period when the update period has expired.

14. The method of claim 13, wherein the collecting the quality measurements further comprises obtaining measurements of cellular channel metrics regarding channel quality, link throughput, loading and congestion level of each radio, and Quality of Service (QoS) needs.

15. The method of claim 13, wherein the collecting the quality measurements further comprises the multi-mode user equipments and an integrated evolved nodeB (eNodeB) coordinating to collect the quality measurements associated with the plurality of RATs.

16. The method of claim 13 further comprising determining whether the transmissions have been completed and ending the assigning and repartitioning of RAT assignments when the transmissions have been determined to have been completed, else returning to the obtaining the collected quality measurements and the determining whether the update period counter is equal to zero.

* * * * *